US010865866B2

(12) United States Patent
Kanayama

(10) Patent No.: US 10,865,866 B2
(45) Date of Patent: Dec. 15, 2020

(54) STRAIN WAVE GEARING AND ACTUATOR

(71) Applicant: HARMONIC DRIVE SYSTEMS INC., Tokyo (JP)

(72) Inventor: Naoki Kanayama, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 272 days.

(21) Appl. No.: 16/068,413

(22) PCT Filed: Feb. 2, 2016

(86) PCT No.: PCT/JP2016/053101
§ 371 (c)(1),
(2) Date: Jul. 6, 2018

(87) PCT Pub. No.: WO2017/134749
PCT Pub. Date: Aug. 10, 2017

(65) Prior Publication Data
US 2019/0017585 A1    Jan. 17, 2019

(51) Int. Cl.
*F16H 49/00* (2006.01)
(52) U.S. Cl.
CPC .................. *F16H 49/001* (2013.01)
(58) Field of Classification Search
CPC ....................................... F16H 49/001
See application file for complete search history.

(56) References Cited

U.S. PATENT DOCUMENTS

| | | | | |
|---|---|---|---|---|
| 2,931,248 A | * | 4/1960 | Walton | F16H 49/001 |
| | | | | 74/640 |
| 3,561,006 A | * | 2/1971 | Humphreys | F16H 49/001 |
| | | | | 310/82 |
| 3,579,276 A | * | 5/1971 | Newell | F16H 49/001 |
| | | | | 310/82 |

(Continued)

FOREIGN PATENT DOCUMENTS

| | | |
|---|---|---|
| JP | S63-023570 A | 1/1988 |
| WO | WO2012/157020 A1 | 11/2012 |

OTHER PUBLICATIONS

International Search Report (PCT/ISA/210) dated Apr. 5, 2016, by the Japanese Patent Office as the International Searching Authority for International Application No. PCT/JP2016/053101.

(Continued)

*Primary Examiner* — Terence Boes
(74) *Attorney, Agent, or Firm* — Buchanan Ingersoll & Rooney PC

(57) ABSTRACT

A strain wave gearing has a wave generator for generating a wave motion that repeatedly flexes each part in the circumferential direction of an externally toothed gear in the radial direction. The wave generator is provided with a plurality of wave-generating members arranged at positions at a prescribed angular interval along the circumferential direction of the externally toothed gear. Each of the wave-generating members is provided with an outer circumferential cam surface, rotates centered on a rotation center line that is parallel to the device center axis line, and repeatedly flexes each part of the externally toothed gear in the radial direction with a prescribed amplitude. A strain wave gearing, which is suitable for forming a large device hollow part, can be obtained.

10 Claims, 7 Drawing Sheets

(56) References Cited

U.S. PATENT DOCUMENTS

| | | | |
|---|---|---|---|
| 3,709,059 A * | 1/1973 | Elsel | F16H 49/001 |
| | | | 74/661 |
| 2006/0213294 A1* | 9/2006 | Osle | F16H 49/001 |
| | | | 74/89.23 |
| 2012/0270692 A1* | 10/2012 | Hoebel | F16H 7/06 |
| | | | 475/149 |
| 2015/0167801 A1 | 6/2015 | Bonfiglio et al. | |
| 2016/0341267 A1* | 11/2016 | Takada | F16D 59/02 |
| 2017/0184190 A1* | 6/2017 | Klassen | F16H 49/001 |
| 2017/0321791 A1* | 11/2017 | Dankbaar | F16C 1/12 |
| 2018/0031108 A1* | 2/2018 | Sakata | F16H 55/06 |

OTHER PUBLICATIONS

Written Opinion (PCT/ISA/237) dated Apr. 5, 2016, by the Japanese Patent Office as the International Searching Authority for International Application No. PCT/JP2016/053101.

* cited by examiner (A)

(B)

(C)

(A)

(B)

(C)

(A)

(B)

STRAIN WAVE GEARING AND ACTUATOR

TECHNICAL FIELD

The present invention relates to a strain wave gearing provided with a wave generator suitable for realizing a hollow actuator.

BACKGROUND ART

As an actuator configured to have a strain wave gearing assembled to a motor, there has been known a hollow actuator provided with a hollow part extending to pass through the center of the actuator. Patent document 1 discloses a hollow actuator employing a strain wave gearing provided with a top-hat-shaped externally toothed gear.

PRIOR ART DOCUMENT

Patent Document

Patent document 1: WO2012/157020

SUMMARY OF THE INVENTION

Problems to be Solved by the Invention

In a hollow actuator using a strain wave gearing, the inner diameter of the hollow part of the actuator is limited by the inner diameter of the center through hole formed in the wave generator that are disposed on the center side of the actuator. The wave generator is generally provided with a rigid cam plate and a wave-generator bearing mounted on the outer circumferential surface of the rigid cam plate, and the through hole is formed in the rigid cam plate. In order to increase the hollow diameter without the increase in the outer diameter of the wave generator, the thickness of the rigid cam plate in the radial direction must be reduced, since the rigid cam plate must be formed with the through hole having a larger diameter. It is also necessary for the wave-generator bearing mounted on the outer circumferential surface of the rigid cam plate to be made thin in thickness. There is, however, a limit to thinning the component parts of the wave generator, and the hollow part having an intended size cannot be formed in some cases.

In view of the above, an object of the present invention is to provide a strain wave gearing provided with a wave generator suitable for realizing an actuator having a large hollow part, and to provide an actuator employing this strain wave gearing.

Means of Solving the Problems

In order to solve the above problems, a strain wave gearing of the present invention has:
 a rigid internally toothed gear;
 a flexible externally toothed gear that is made to flex into a non-circular shape to partially mesh with the internally toothed gear; and
 a wave generator for generating a wave motion that repeatedly flexes each part in a circumferential direction of the externally toothed gear in a radial direction so that partial meshing positions of the externally toothed gear with the internally toothed gear move in a circumferential direction of the internally toothed gear, wherein the wave generator is provided with a plurality of wave-generating members arranged at positions at a prescribed angular interval along a circumferential direction of the externally toothed gear; and
 each of the wave-generating members is provided with an outer circumferential cam surface that faces each part of the externally toothed gear in the radial direction and repeatedly flexes each part of the externally toothed gear in the radial direction with a prescribed amplitude when the wave-generating member rotates centered on a rotation center line that is parallel to a center axis line of the externally toothed gear.

The wave generator of the strain wave gearing according to the present invention is constituted by a plurality of the wave-generating members. A conventional wave generator is configured so that one or a plurality of wave-generating members such as rigid cam plates having an ellipsoidal profile or other non-circular profile are arranged concentrically with the externally toothed gear in the center portion of the strain wave gearing. When a hollow part passing through the device center portion is provided, the hollow part is formed in a manner extending to pass through the component parts of the wave generator. According to the present invention, the component parts of the wave generator are arranged along the circumferential direction of the externally toothed gear. In addition, it is enough for the wave-generating members to flex the facing part of the externally toothed gear in the radial direction with a very small amplitude, and therefore the wave-generating members can be small in diameter compared to the conventional wave-generating member such as a rigid cam plate.

In this way, the component parts of the wave generator are not arranged in the device center portion, and the respective wave-generating members, which are arranged along the circumferential direction of the externally toothed gear, are small in size, whereby a hollow part having a large diameter can be provided in the device center portion.

In the present invention, the externally toothed gear can be made to flex into a non-circular shape by pressing from the outer circumference side. Alternatively, the externally toothed gear can be made to flex into a non-circular shape by pressing from the inner circumference side. Thus, the outer circumferential cam surface of each wave-generating member may be made to face or instead come in contact with the inner circumferential surface portion of the external-teeth forming section of the externally toothed gear. Or, it may be made to face or instead come in contact with the outer circumferential surface portion of the externally toothed gear. The outer circumferential surface portion is located adjacent to the external-teeth forming section in the direction of the center axis line.

When the wave-generating members having the same outer circumferential cam surface are employed, the respective wave-generating members are arranged so that the rotation center lines of the respective wave-generating members are positioned at equal angular intervals on the same circle centered on the center axis line of the externally toothed gear, for example.

A wave motion can be generated in the externally toothed gear by synchronously rotating the respective wave-generating members while maintaining predetermined phase differences among them.

For example, members having a true-circle outer circumferential cam surface, which rotate eccentrically, can be employed as the wave generating members. In other words, the outer circumferential cam surface of the wave generating members may be a circular outer circumferential surface that is eccentric with respect to the rotation center line.

Next, an actuator of the present invention has: the strain wave gearing having the above constitution; and one or a plurality of motors for rotating the wave-generating members of the strain wave gearing around the rotation center line.

In this case, a plurality of wave-generating members can be driven to rotate by one motor. Instead, a plurality of motor can be linked to the respective wave-generating members one to one.

When each wave-generating member is provided with the motor, the wave generator is coaxially linked to the motor, for example. Specifically, the wave-generating members are respectively arranged so that the rotation center lines of the wave generating members are positioned at equal angular intervals on the same circle centered on the center axis line of the externally toothed gear. Each motor is arranged with respect to each wave-generating member so that the motor center line is in coincide with the rotation center line.

In this case, the strain wave gearing can be formed with a hollow part extending to pass therethrough in the direction of the center axis line, and the wave-generating members and motors can be arranged so as to surround the hollow part.

In this way, it is advantageous in realizing an actuator having a large hollow diameter compared to a case in which the wave-generating members are arranged in the device center portion.

MODE FOR CARRYING OUT THE INVENTION

Embodiment 1

Figure 1:
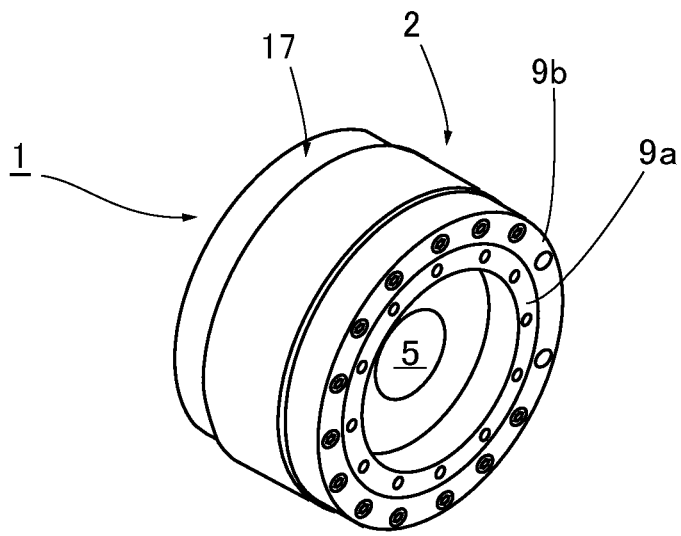
FIGS. 1(A), 1(B) and 1(C) includes a perspective view, a side view and an end view, illustrating an example of a hollow actuator according to the present invention.
Figure 1:
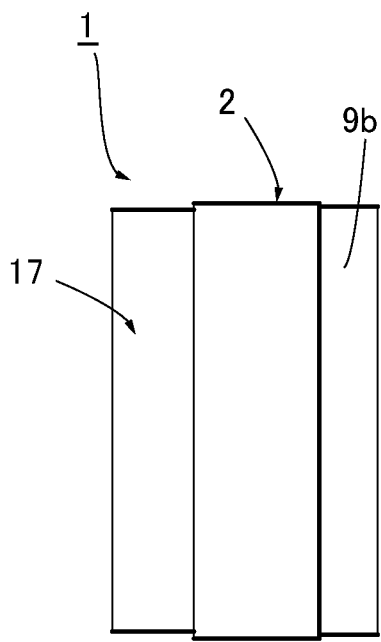
Figure 1:
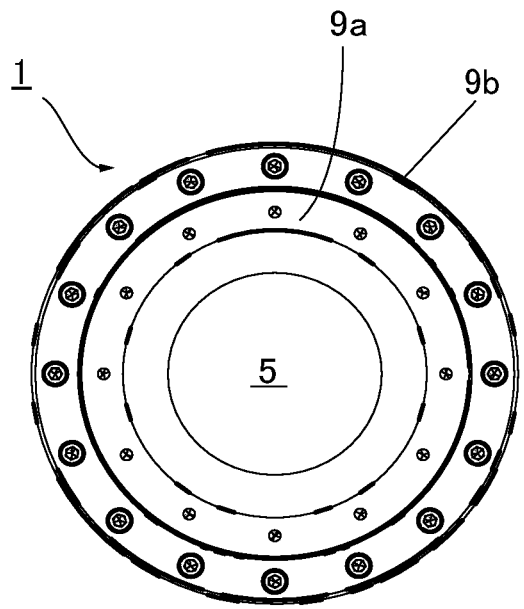

FIGS. 1 to 4 illustrate a hollow actuator of Embodiment 1 according to the present invention. FIG. 1(A) illustrates the hollow actuator of Embodiment 1 according to the present invention, FIG. 1(B) is a side view thereof, and FIG. 1(C) is an end view thereof. FIG. 2(A) is a semi perspective view illustrating a state in which the hollow actuator is cut along a plane including the center axis line, and FIG. 2(B) is a longitudinal cross-sectional view thereof. FIG. 3(A) is a perspective view illustrating a strain wave gearing assembled to the hollow actuator, FIG. 3(B) is an end view thereof, FIG. 3(C) is a side view thereof, and FIG. 3(D) is a longitudinal cross-sectional view thereof.

The hollow actuator 1 is provided with a device housing 2 having a cylindrical shape, a top-hat-type strain wave gearing 3 attached to the device housing 2, and a plurality of motors, three motors 4(1) to 4(3) in this example, attached to the device housing 2. A device hollow part 5 having a circular cross-section, which extends to pass through in the direction of the device center axis line 1a, is formed in the center portion of the hollow actuator 1.

The motors 4(1) to 4(3) are arranged at an angular interval of 120 degrees on the same circle centered on the device center axis line 1a, for example. Each of the motors 4(1) to 4(3) is attached to the device housing 2 so that the rotation center line 4b of the motor shaft 4a thereof is in parallel to the device center axis line 1a.

Figure 3:
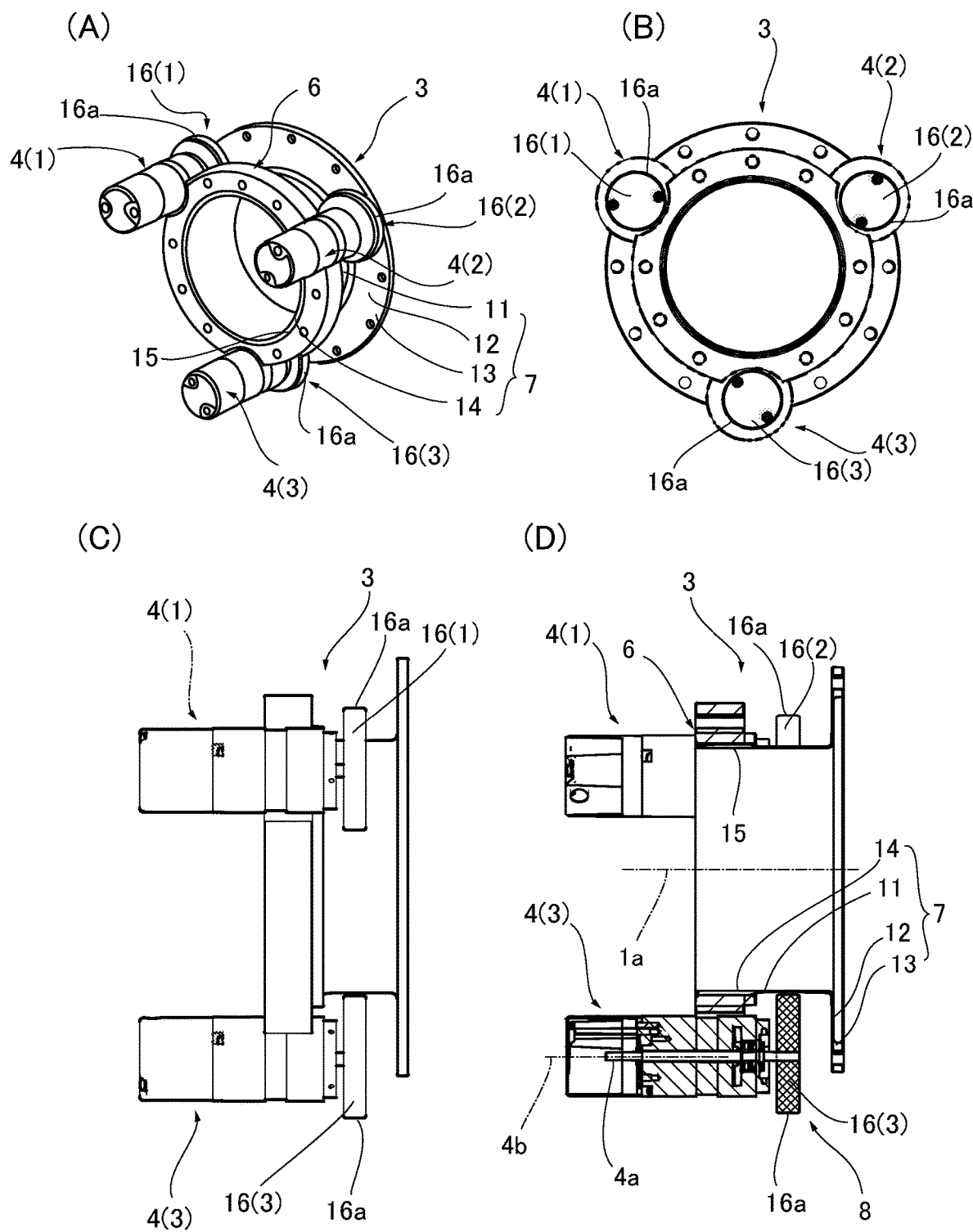
FIGS. 3(A), 3(B), 3(C) and 3(D) includes a perspective view, an end view, a side view and a longitudinal cross-sectional view, illustrating the strain wave gearing of the hollow actuator of FIG. 1.

The strain wave gearing 3 is provided with a rigid internally toothed gear 6 having an annular shape, a flexible externally toothed gear 7 having a top-hat shape, and a wave generator 8 having wave-generating members 16(1) to 16(3), as can be seen from FIG. 3. The internally toothed gear 6 is fixed to the inner circumferential part of the device housing 2. The externally toothed gear 7 is supported in a free rotating state by the device housing 2 via a main bearing 9, a crossed roller bearing in this example.

The externally toothed gear 7 of the strain wave gearing 3 is flexed into a non-circular shape by the wave-generating members 16(1) to 16(3) constituting the wave generator 8, and is meshed partially with the internally toothed gear 6. The externally toothed gear 7 is flexed into an ellipsoidal shape and is meshed with the internally toothed gear 6 at positions on both ends of the major axis of the ellipsoidal shape in this example. The wave-generating members 16(1) to 16(3) of the wave generator 8 are driven to rotate by the motors 4(1) to 4(3). When driven to rotate, the wave-generating members 16(1) to 16(3) generate a wave motion that repeatedly flexes each part in the circumferential direction of the externally toothed gear 7 in the radial direction so that the partial meshing positions of the externally toothed gear 7 with the internally toothed gear 6 move in the circumferential direction of the internally toothed gear 6.

Figure 2:
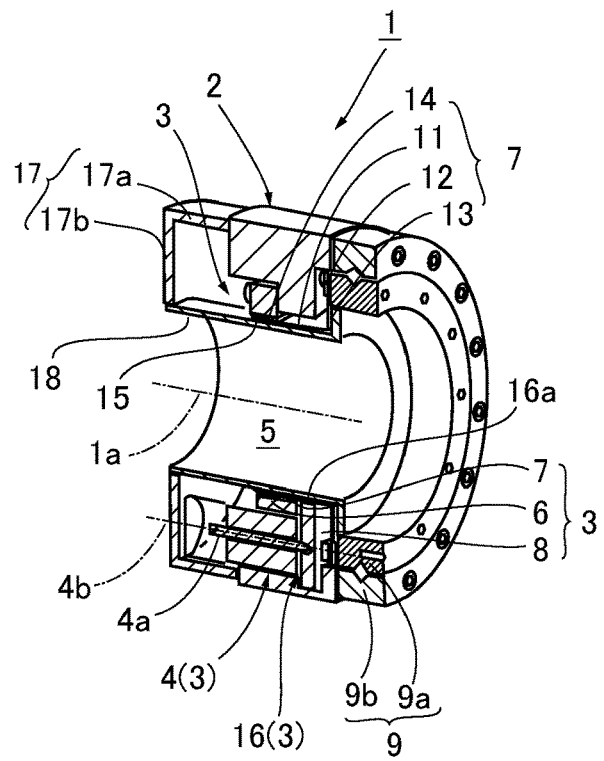
FIGS. 2(A) and 2(B) includes a semi perspective view and a longitudinal cross-sectional view of the hollow actuator of FIG. 1.
Figure 2:
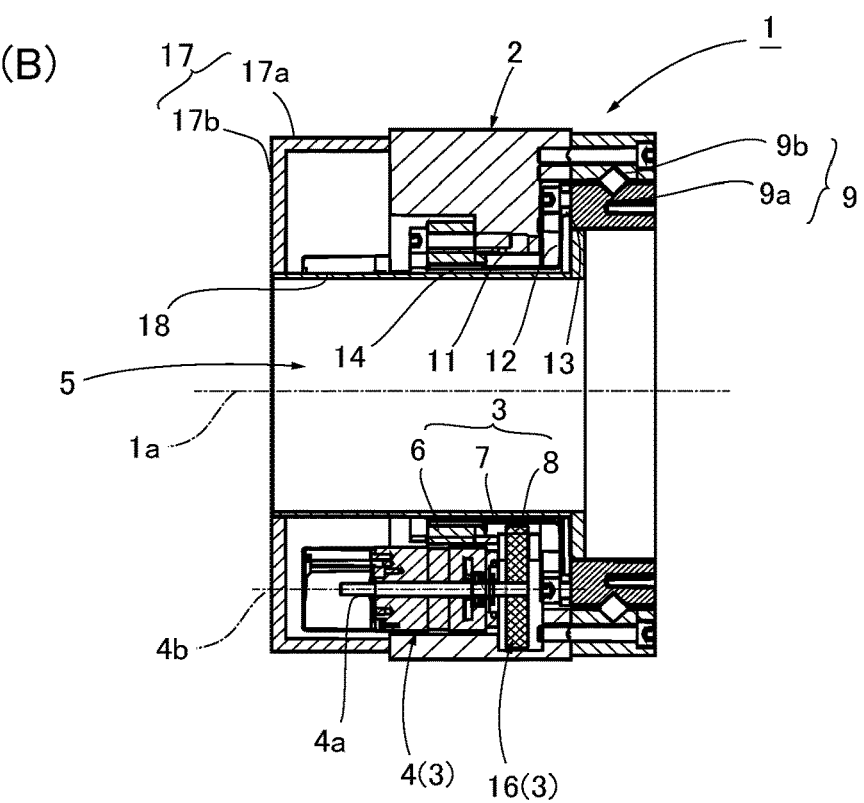

As can be seen from FIG. 3(D), the externally toothed gear 7 is provided with a cylindrical barrel part 11 which is radially flexible, a disc-shaped diaphragm 12 extending outward in the radial direction from one end of the cylindrical barrel part 11, a rigid boss 13 which has an annular shape and is formed continuous from the outer peripheral edge of the diaphragm 12, and external teeth 14 formed on the outer circumferential surface portion at the other end of the cylindrical barrel part 11. The external-teeth forming section of the cylindrical barrel part 11 where the external teeth 14 are formed is disposed coaxially inside the internally toothed gear 6, so that the external teeth 14 face the internal teeth 15 of the internally toothed gear 6. As illustrated in FIG. 2, the boss 13 is fixed to the end face of the inner ring 9a of the main bearing 9, the outer ring 9b of which is fixed to the end face of the device housing 2.

The wave-generating members 16(1) to 16(3), which constitute the wave generator 8, are arranged at equal angular intervals along the circumferential direction of the externally toothed gear 7. The wave-generating members 16(1) to 16(3) are, for example, eccentric cams having a circular outer circumferential surface that is the outer circumferential cam surface 16a. The wave-generating members are fixed to the respective motor shafts 4a of the three motors 4(1) to 4(3) in a state eccentric by a certain amount with respect thereto. In other words, the outer circumferential cam surface 16a is a true circle centered on the position which is eccentric to the rotation center line 4b of each motor 4(1) to 4(3) by a certain amount. The amount of eccentricity corresponds to the required radial flexing amount of each part in the circumferential direction of the externally toothed gear 7.

As can be seen from FIG. 3, the wave-generating members 16(1) to 16(3) of this example are arranged at the outer circumferential side of the cylindrical barrel part 11 of the externally toothed gear 7. The outer circumferential cam surface 16a of each of the wave-generating members 16(1) to 16(3) is in contact with the outer circumferential portion of the cylindrical barrel part 11. This outer circumferential portion (which is an outer circumferential surface portion at the side of the diaphragm 12) is adjacent to the external-teeth forming section of the externally toothed gear 7 in the direction of the center axis line of the externally toothed gear 7 (device center axis line 1a).

As can be seen from FIG. 2, the motors 4(1) to 4(3) are arranged within the annular space surrounded by an outer-side cover 17 and an inner-side cover 18. The outer-side cover 17 is attached to the device housing 2 and is provided with a cylindrical cover portion 17a and an annular end-face cover portion 17b. The inner-side cover 18 defines the device hollow part 5 and is attached coaxially to the outer-side cover 17.

In the hollow actuator 1 having the above constitution, the motors 4(1) to 4(3) are driven synchronously by a not-illustrated control unit to eccentrically rotate the respective wave-generating members 16(1) to 16(3) of the wave generator 8. The outer circumferential cam surfaces 16a of the wave-generating members 16(1) to 16(3) are in contact with the outer circumferential surface portion of the cylindrical barrel part 11 of the externally toothed gear 7. These outer circumferential cam surfaces cause to generate a wave motion by which each part in the circumferential direction of the externally toothed gear 7 is repeatedly flexed in the radial direction so that the partial meshing positions of the externally toothed gear 7 with the internally toothed gear 6 are moved in the circumferential direction of the internally toothed gear 6.

Figure 4:
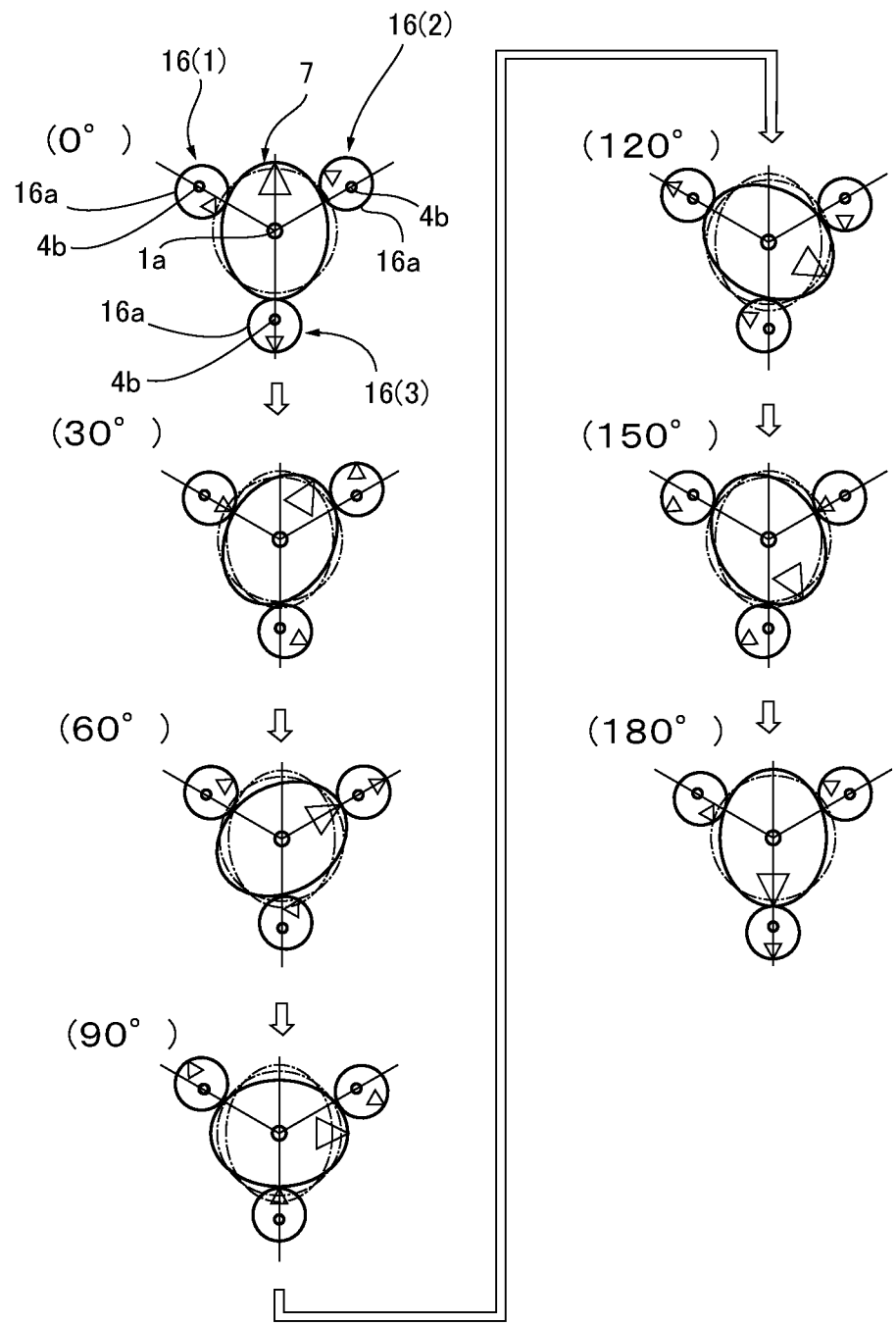
FIG. 4 is an explanatory view illustrating state of flexion of the externally toothed gear caused by the wave-generating members.

FIG. 4 is an explanatory view illustrating the externally toothed gear 7 which is flexed into an ellipsoidal shape by the wave-generating members 16(1) to 16(3) of the wave generator 8. The initial shape of the external-teeth forming section of the externally toothed gear 7 is a true circle as illustrated by one-dotted lines in this drawing. For example, the external-teeth forming section of the externally toothed gear 7 is flexed by the three wave-generating members 16(1) to 16(3) into an ellipsoidal shape, the major axis of which extends in the vertical direction, as illustrated by the (0-degree) rotation state in the drawing.

When the ellipsoidal shape is rotated around the device center axis line 1a from this state, the wave-generating members 16(1) to 16(3) can be rotated so that these wave-generating members 16(1) to 16(3) circumscribe the ellipsoidal shape at each rotational position. Specifically, the wave-generating members 16(1) to 16(3) are synchronously and eccentrically rotated around the rotation center line 4b, whereby generating the wave motion that repeatedly flexes each part in the circumferential direction of the externally-toothed gear 7 so that the partial meshing portions (the both end portions of the major-axis of the ellipsoidal shape) with the internally toothed gear 6 move in the circumferential direction of the internally toothed gear 6.

Here, the wave generator 8 is provided with the three wave-generating members 16(1) to 16(3). The number of the wave-generating members is not limited to three but may be four or more.

The wave-generating members 16(1) to 16(3) of this example are provided with circular outer circumferential cam surfaces 16a and eccentrically rotate with respect to the rotation center lines 4b of the respective motors 4(1) to 4(3). The wave-generating members 16(1) to 16(3) are not limited to an eccentric cam. It is possible, for example, that a cam plate having an ellipsoidal profile or other profile be rotated around the rotation center line 4b to generate a wave motion in the externally toothed gear 7. It is also possible to use an outer circumferential cam surface having a variety of profiles other than an ellipsoidal profile.

The wave-generating members 16(1) to 16(3) are constituted by a cam plate having a circular profile. Instead, the wave-generating member may have a constitution provided with rollers. In addition, the cam plate is in direct contact with the outer circumferential surface of the externally toothed gear. Alternatively, rollers or bearings are mounted on the outer circumferential surface of the cam plate, via which the outer circumferential portion of the externally toothed gear is pressed by the wave-generating members.

On the other hand, the motors 4(1) to 4(3) can be driven separately by the respective motors each provided with encoders. It is possible that an encoder be mounted on one motor and the other motors be driven synchronously with the one motor. It is also possible that brakes be mounted on the respective motors.

Embodiment 2

Figure 5:
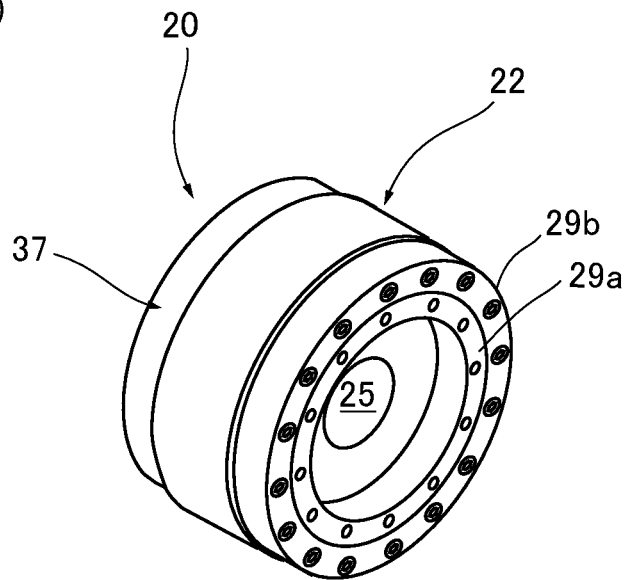
FIGS. 5(A), 5(B) and 5(C) includes a perspective view, side view and an end view, illustrating another example of the hollow actuator according to the present invention.
Figure 5:
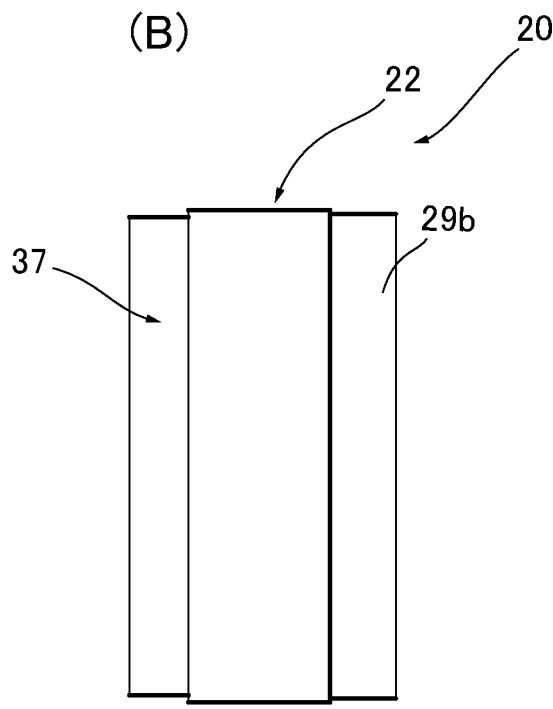
Figure 5:
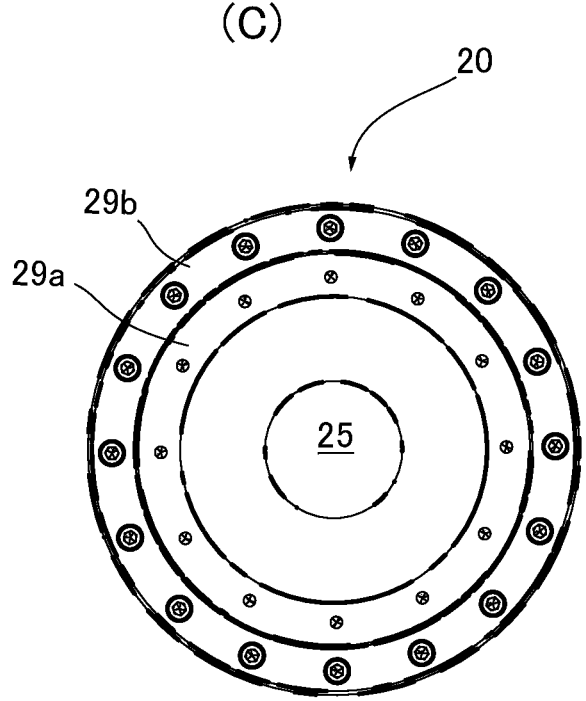
Figure 6:
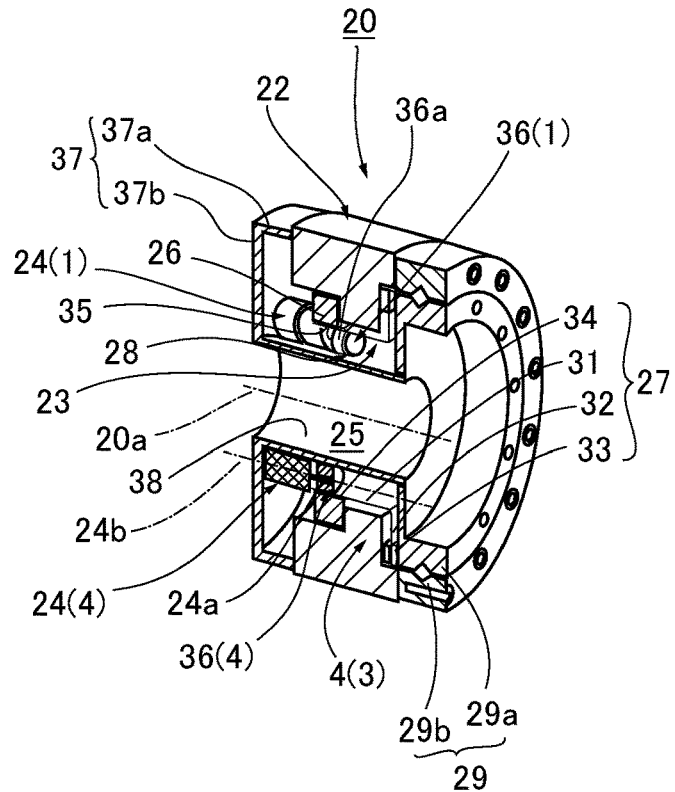
FIGS. 6(A) and 6(B) includes a semi perspective view and a longitudinal cross-sectional view of the hollow actuator of FIG. 5.
Figure 6:
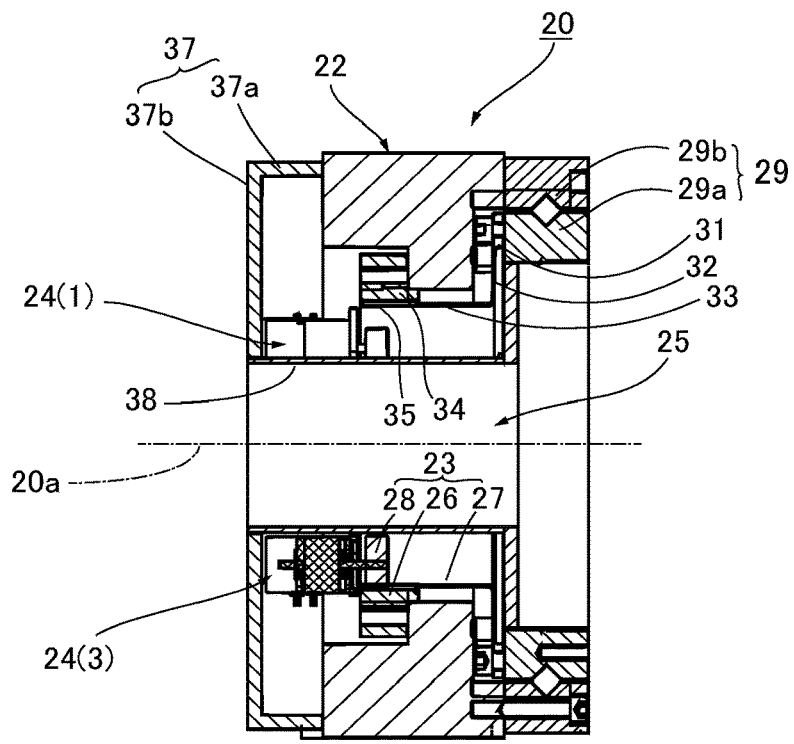
Figure 7:
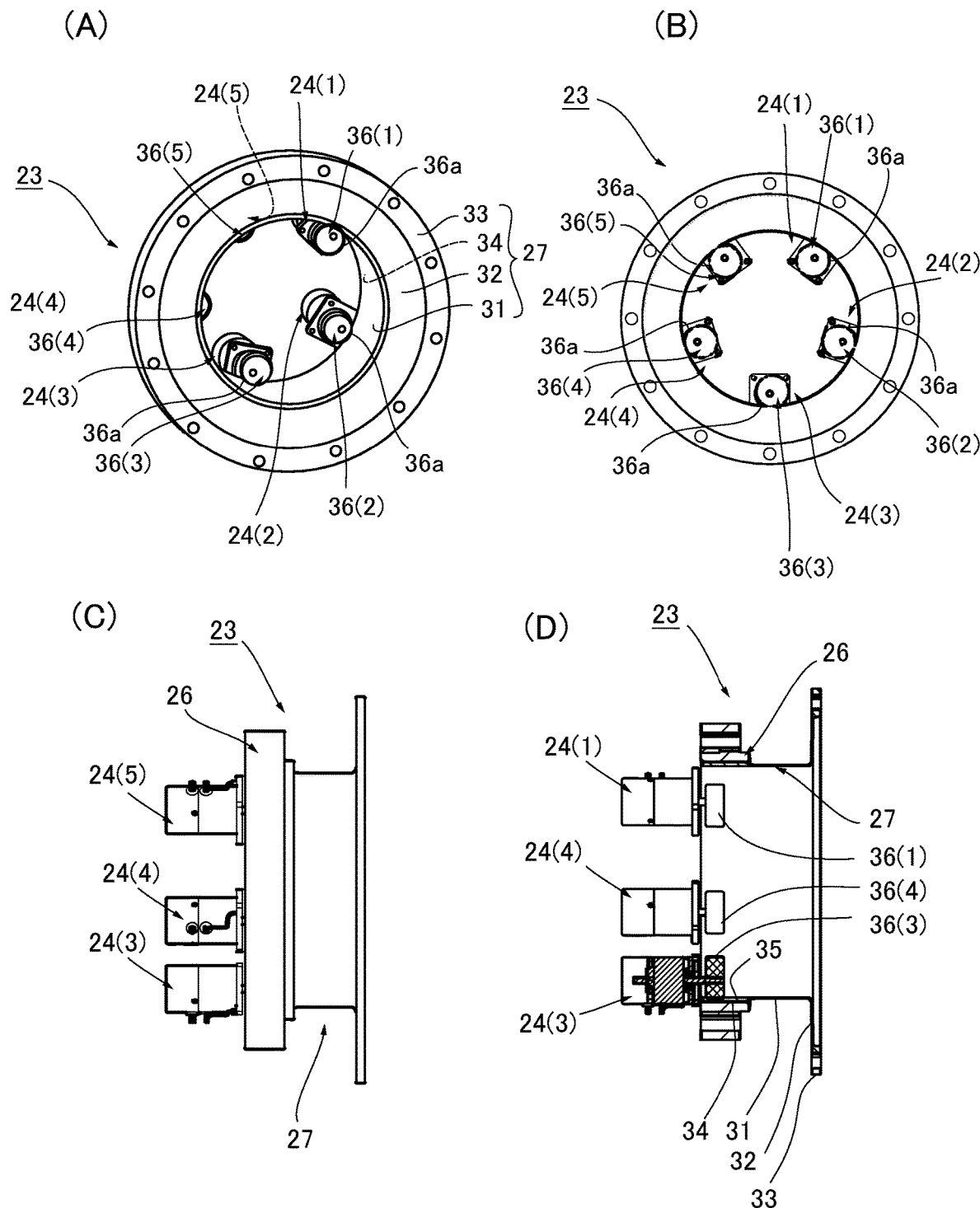
FIGS. 7(A), 7(B), 7(C) and 7(D) includes a perspective view, an end view, a side view and a longitudinal cross-sectional view, illustrating the strain wave gearing of the hollow actuator of FIG. 5.

FIGS. 5 to 7 illustrate a hollow actuator of Embodiment 2 according to the present invention. FIG. 5(A) is a perspective view illustrating a hollow actuator of Embodiment 2 according to the present invention, FIG. 5(B) is a side view thereof, and FIG. 5(C) is an end view thereof. FIG. 6(A) is a semi perspective view illustrating the hollow actuator in a state cut along a plane including the device center axis thereof, and FIG. 6(B) is a longitudinal cross-sectional view. FIG. 7(A) is a perspective view of a strain wave gearing assembled to the hollow actuator, FIG. 7(B) is an end view thereof, FIG. 7(C) is a side view thereof, and FIG. 7(D) is a longitudinal cross-sectional view.

The hollow actuator 20 of Embodiment 2 has the basic constitution that is the same as that of the hollow actuator 1 of FIG. 1, but is different in that wave-generating members of a wave generator are arranged on the inner circumferential side of the external-teeth forming section of an externally toothed gear and that five wave-generating members are arranged.

The hollow actuator 20 is provided with a device housing 22 having a cylindrical shape, a top-hat-type strain wave gearing 23 attached to the device housing 22, and five motors 24(1) to 24(5) attached to the device housing 22. A device hollow part 25 having a circular cross-section, which extends to pass through in the direction of the device center axis line 20a, is formed in the center portion of the hollow actuator 20.

The motors 24(1) to 24(5) of this example are arranged at an angular interval of 72 degrees on the same circle centered on the device center axis line 20a as illustrated in FIG. 7. Each of the motors 24(1) to 24(5) is attached to the device housing 22 so that the rotation center line 24b of the motor shaft 24a thereof is in parallel to the device center axis line 20a.

The strain wave gearing 23 is provided with a rigid internally toothed gear 26 having an annular shape, a flexible externally toothed gear 27 having a top-hat shape, and a wave generator 28 having five wave-generating members 36(1) to 36(5), as illustrated in FIGS. 6 and 7. The internally toothed gear 26 is fixed coaxially to the inner circumferential part of the device housing 22. The externally toothed gear 27 is supported in a free rotating state by the device housing via a main bearing 29, a crossed roller bearing in this example.

The externally toothed gear 27 of the strain wave gearing 23 is flexed into a non-circular shape by the five wave-generating members 36(1) to 36(5) constituting the wave generator 28, so that it is partially meshed with the internally toothed gear 26. The externally toothed gear 27 of this example is flexed into an ellipsoidal shape to mesh with the internally toothed gear 26 at the positions on both ends of the major axis of the ellipsoidal shape. When the wave-generating members 36(1) to 36(5) of the wave generator 28 are driven to rotate by the motors 24(1) to 24(5), there is generated a wave motion by which each part in the circumferential direction of the externally toothed gear 27 is repeatedly flexed in the radial direction so that the partial meshing positions of the externally toothed gear 27 with the internally toothed gear 26 move in the circumferential direction of the internally toothed gear 26.

As can be seen from FIGS. 6(B) and 7(D), the externally toothed gear 27 is provided with a cylindrical barrel part 31 which is flexible in the radial direction, a disc-shaped diaphragm 32 extending outward in the radial direction from one end of the cylindrical barrel part 31, a rigid boss 33 which has an annular shape and is formed continuous from the outer peripheral edge of the diaphragm 32, and external teeth 34 formed on the outer circumferential surface portion on the other end of the cylindrical barrel part 31. The external-teeth forming section of the cylindrical barrel part 31 where the external teeth 34 are formed is arranged coaxially inside the internally toothed gear 26, in which the external teeth 34 face the internal teeth 35 of the internally toothed gear 26. The boss 33 is fixed to the end face of the inner ring 29a of the main bearing 29, the outer ring 29b of which is fixed to the end face of the device housing 22.

The wave-generating members 36(1) to 36(5) of the wave generator 28 are arranged at positions at equal angular intervals along the circumferential direction of the externally toothed gear 27. The wave-generating members 36(1) to 36(5) are eccentric cams each having a circular outer circumferential surface that is the outer circumferential cam surface 36a, for example, and are respectively fixed to the motor shafts 24a of the five motors 24(1) to 24(5) in an eccentric state by a certain amount. In other words, the circular outer circumferential camshafts 36a are respectively true circles centered on the positions that are eccentric by a certain amount from the respective rotation center lines 24b of the motors 24(1) to 24(5). The amount of eccentricity corresponds to the radial flexing amount that is required for each part in the circumferential direction of the externally toothed gear 27.

Here, the wave-generating members 36(1) to 36(5) of this example are arranged on the inner circumferential side of the cylindrical barrel part 31 of the externally toothed gear 27. The outer circumferential cam surfaces 36a of the wave-generating members 36(1) to 36(5) are respectively in contact with the inner circumferential surface portion of the external-teeth forming section of the externally toothed gear 27.

As can be seen from FIG. 6, the motors 24(1) to 24(5) are arranged in an annular space surrounded by an outer-side cover 37 and an inner-side cover 38. The outer-side cover 37 is attached to the device housing 22 and is provided with a cylindrical cover portion 37a and an annular end-face cover portion 37b. The inner-side cover 38 defines the device hollow part 25 and is coaxially attached to the outer-side cover 37.

In the hollow actuator 20 having the above constitution, the motors 24(1) to 24(5) are synchronously driven by a not-illustrated control unit to eccentrically rotate the respective wave-generating members 36(1) to 36(5) of the wave generator 28. The outer circumferential cam surfaces 36a of the wave-generating members 36(1) to 36(5) are in contact with the inner circumferential surface portion of the externally toothed gear 27, and generates a wave motion that repeatedly flexes each part in the circumferential direction of the externally toothed gear 27 in the radial direction so that the partial meshing positions of the externally toothed gear 27 with the internally toothed gear 26 move in the circumferential direction of the internally toothed gear 26 in accordance with the rotation of the wave-generating members.

The invention claimed is:

1. A strain wave gearing comprising:
    a device housing;
    a rigid internally toothed gear;
    a flexible externally toothed gear that is made to flex into a non-circular shape to partially mesh with the internally toothed gear; and
    a wave generator for generating a wave motion that repeatedly flexes each part in a circumferential direction of the externally toothed gear in a radial direction so that partial meshing positions of the externally toothed gear with the internally toothed gear move in a circumferential direction of the internally toothed gear,
    wherein the wave generator has a plurality of wave-generating members mounted to the device housing at fixed positions at a prescribed angular interval along the circumferential direction of the externally toothed gear; and
    each of the wave-generating members has an outer circumferential cam surface for facing each part of the externally toothed gear in the radial direction and for repeatedly flexing each part of the externally toothed gear in the radial direction with a prescribed amplitude when the wave-generating member rotates centered on the rotation center line that is parallel to a center axis line of the externally toothed gear;
    wherein the outer circumferential cam surface of each of the wave-generating members is eccentric with respect to a respective rotation center line of each of the wave-generating members.

2. The strain wave gearing according to claim 1,
    wherein the outer circumferential cam surface of each of the wave generating members is in contact with or faces either one of an inner circumferential surface portion of an external-teeth forming section of the externally toothed gear and an outer circumferential surface portion of the externally toothed gear, the outer circumferential surface portion being located adjacent to the external-teeth forming section in a direction of the center axis line.

3. The strain wave gearing according to claim 1,
    wherein the wave-generating members are arranged so that the rotation center lines of the wave-generating members are respectively positioned at an equal angular interval on a same circle centered on the center axis line of the externally toothed gear.

4. The strain wave gearing according to claim 1, wherein the outer circumferential cam surface of each of the wave-generating members is a circular outer circumferential surface that is eccentric with the rotation center line.

5. An actuator comprising:
the strain wave gearing according to claim 1; and
one or a plurality of motors for rotating the respective wave-generating members of the strain wave gearing around the rotation center line.

6. The actuator according to claim 5, wherein each of the the wave-generating members is respectively provided with one of the plurality of motors.

7. The actuator according to claim 6, wherein the outer circumferential cam surface of each of the wave generating members is in contact with or faces either one of an inner circumferential surface portion of an external-teeth forming section of the externally toothed gear and an outer circumferential surface portion of the externally toothed gear, the outer circumferential surface portion being located adjacent to the external-teeth forming section in a direction of the rotation center line.

8. The actuator according to claim 7, wherein the wave-generating members are arranged so that a rotation center line of each of the wave-generating members is respectively positioned at an equal angular interval on a same circle centered on the rotation center line of the externally toothed gear; and
the motors are arranged with respect to the wave-generating members so that respective motor center lines thereof coincide with the respective rotation center lines of the wave-generating members.

9. The actuator according to claim 8, wherein the strain wave gearing has a hollow part extending to pass through in a direction of the center axis line; and
the wave-generating members and the motors are arranged to surround the hollow part.

10. The strain wave gearing according to claim 1, wherein the rigid internally toothed gear is mounted to the device housing in a fixed position.

\* \* \* \* \*